(12) United States Patent
Kubo et al.

(10) Patent No.: US 11,791,614 B2
(45) Date of Patent: Oct. 17, 2023

(54) HARNESS MEMBER

(71) Applicant: Hitachi Metals, Ltd., Tokyo (JP)

(72) Inventors: Yoshinori Kubo, Tokyo (JP); Akitoshi Fujimori, Tokyo (JP); Yiming Jin, Tokyo (JP)

(73) Assignee: PROTERIAL, LTD, Tokyo (JP)

( * ) Notice: Subject to any disclaimer, the term of this patent is extended or adjusted under 35 U.S.C. 154(b) by 0 days.

(21) Appl. No.: 17/549,205

(22) Filed: Dec. 13, 2021

(65) Prior Publication Data

US 2022/0190580 A1  Jun. 16, 2022

(30) Foreign Application Priority Data

Dec. 15, 2020  (JP) .................. 2020-207247

(51) Int. Cl.
*H02G 15/18* (2006.01)
*H02G 3/00* (2006.01)
*H02G 15/013* (2006.01)

(52) U.S. Cl.
CPC ......... *H02G 15/1806* (2013.01); *H02G 3/266* (2013.01); *H02G 15/013* (2013.01)

(58) Field of Classification Search
CPC ...... H02G 3/266; H02G 15/013; H02G 15/04; H02G 15/1806; H01R 4/72
See application file for complete search history.

(56) References Cited

U.S. PATENT DOCUMENTS

2015/0244159 A1*  8/2015  Seifert .................. H02G 15/04
                                                              174/77 R
2018/0204652 A1*  7/2018  Hirooka .................. H01B 7/02

FOREIGN PATENT DOCUMENTS

JP           2015-135793 A      7/2015
JP           2015135793 A    *  7/2015  ............... H01R 4/72

* cited by examiner

*Primary Examiner* — Paresh Paghadal
(74) *Attorney, Agent, or Firm* — Thomas W. Cole; Calderon Safran & Cole P.C.

(57) ABSTRACT

A harness member includes a cable, a housing with an insertion hole through which the cable is inserted, a heat-shrink tubing covering the housing and the cable exposed on one side from the insertion hole, and a hot melt adhesive to seal between the heat-shrink tubing and the cable and between the heat-shrink tubing and the housing. A recess is formed on the housing so as to be recessed from an outer circumferential surface covered with the heat-shrink tubing. At least a portion of the hot melt adhesive melted between the outer circumferential surface of the housing and an inner circumferential surface of the heat-shrink tubing has flowed into the recess.

7 Claims, 9 Drawing Sheets

HARNESS MEMBER

CROSS-REFERENCE TO RELATED APPLICATIONS

The present patent application claims the priority of Japanese patent application No. 2020-207247 filed on Dec. 15, 2020, and the entire contents of Japanese patent application No. 2020-207247 are hereby incorporated by reference.

TECHNICAL FIELD

The present invention relates to a harness member.

BACKGROUND ART

Patent Literature 1 discloses a harness member that includes a cable, a molded resin covering the cable from an outer circumference side, and a heat-shrink tubing which collectively covers the molded resin and a portion of the cable extending out of the molded resin on one side and has a hot melt adhesive (so-called hot melt) arranged on its inner circumferential surface. In the harness member described in Patent Literature 1, the hot melt adhesive ensures sealing between the heat-shrink tubing and both the molded resin and the cable, thereby suppressing the ingress of foreign matter such as water through a gap between the molded resin and the cable.

CITATION LIST

Patent Literature

Patent Literature 1: JP 2015-135793A

SUMMARY OF THE INVENTION

When the heat-shrink tubing with the hot melt adhesive is heated, the hot inch adhesive is softened and at the same time the heat-shrink tubing shrinks inward in its radial direction. At this time, the softened hot melt adhesive interposed between the heat-shrink tubing and the molded resin could act like a lubricant and cause the heat-shrink tubing to be displaced in an axial direction toward the side where the cable extends out. If the heat-shrink tubing is largely displaced from a desired position, the sealing property between the cable and the molded resin may decrease.

The invention was made in view of such circumstances and it is an object of the invention to provide a harness member in which an amount of axial displacement of a heat-shrink tubing before and after shrinkage can be reduced.

So as to achieve the above object, one aspect of the invention provides: a harness member, comprising:
  a cable;
  a housing with an insertion hole through which the cable is inserted;
  a heat-shrink tubing covering the housing and the cable exposed on one side from the insertion hole; and
  a hot melt adhesive to seal between the heat-shrink tubing and the cable and between the heat-shrink tubing and the housing,
  wherein a recess is formed on the housing so as to be recessed from an outer circumferential surface covered with the heat-shrink tubing, and
  wherein at least a portion of the hot melt adhesive melted between the outer circumferential surface of the housing and an inner circumferential surface of the heat-shrink tubing has flowed into the recess.

Effect of the Invention

According to the present invention, it is possible to provide a harness member in which an amount of axial displacement of a heat-shrink tubing before and after shrinkage can be reduced.

BEST MODE FOR CARRYING OUT THE INVENTION

First Embodiment

The first embodiment of the invention will be described in reference to FIGS. 1 to 5.

Note that, embodiments below are described as preferred examples for implementing the invention. Although some part of the embodiments specifically illustrates various technically preferable matters, the technical scope of the invention is not limited to such specific aspects.

(Harness Member 1)

Figure 1:
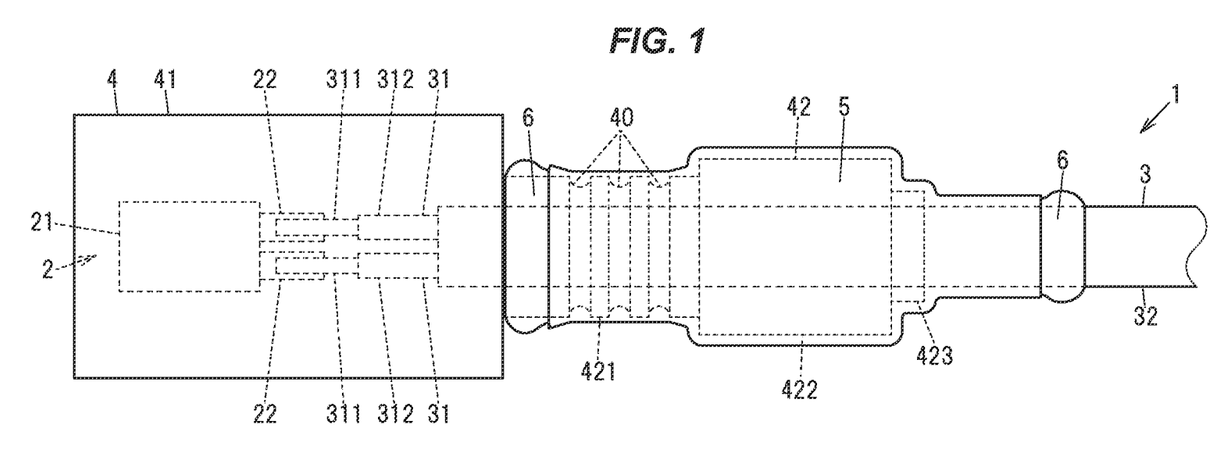
FIG. 1 is a plan view showing a harness member in the first embodiment.
Figure 2:
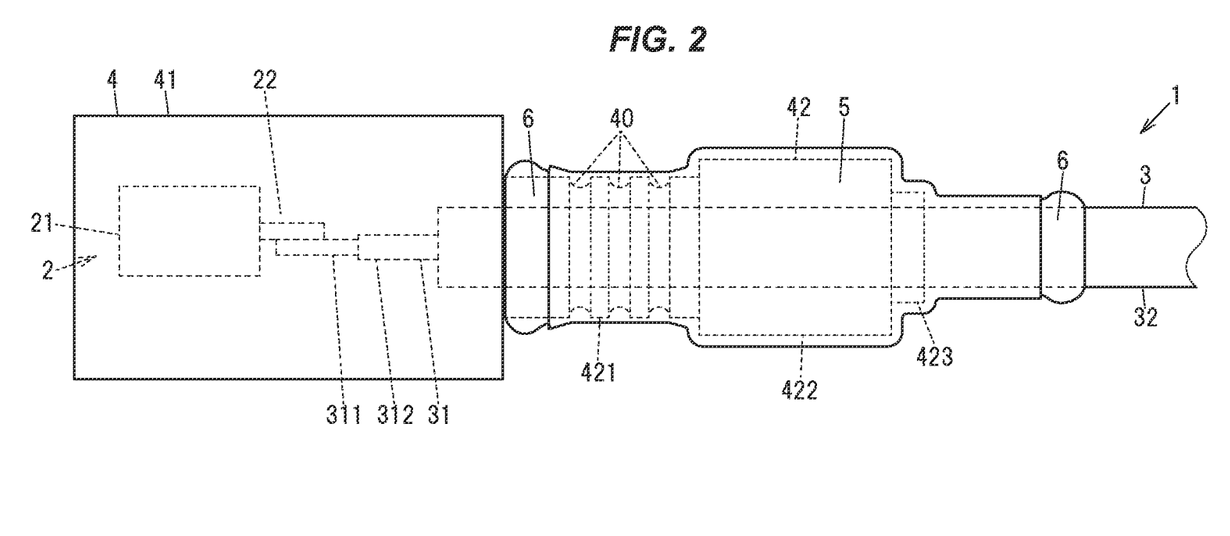
FIG. 2 is a side view showing the harness member in the first embodiment.
Figure 3:
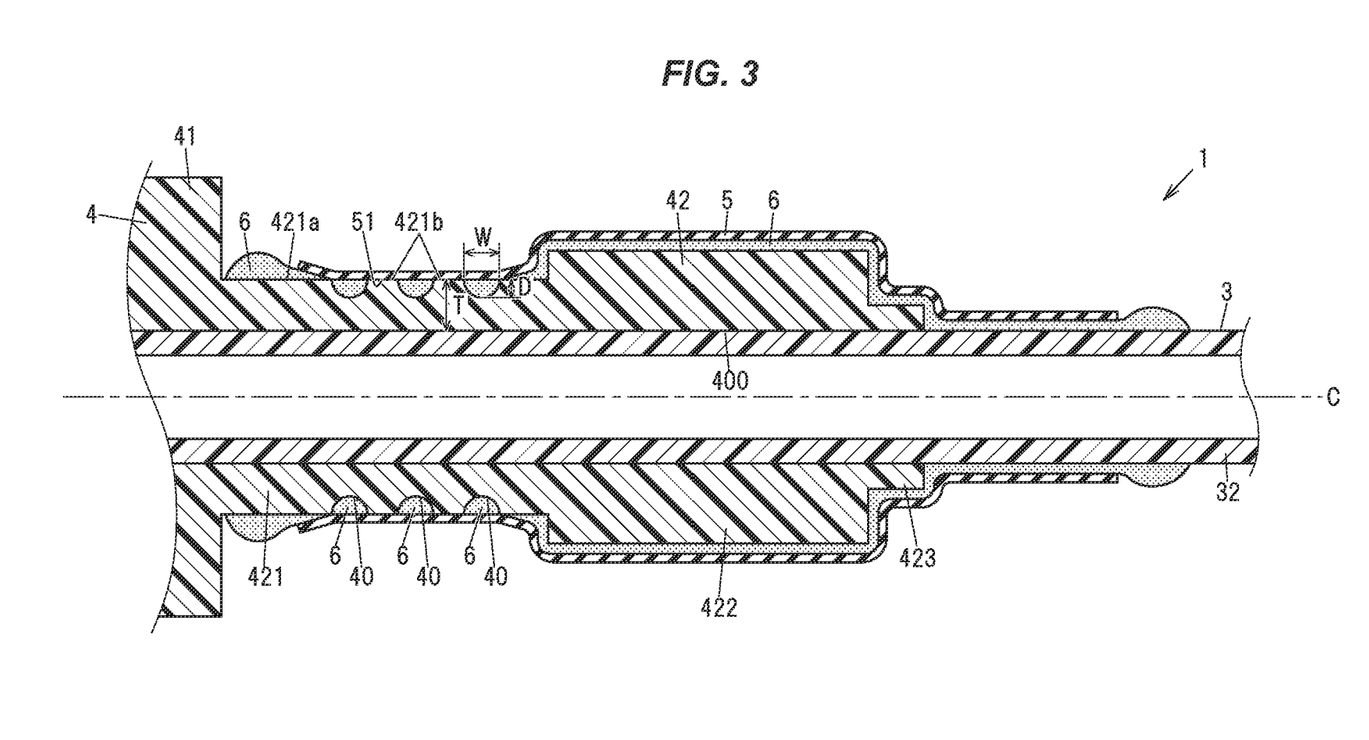
FIG. 3 is a cross-sectional view showing the harness member in the first embodiment, including a central axis of the harness member.

FIG. 1 is a plan view showing a harness member 1. FIG. 2 is a side view showing the harness member 1. FIG. 3 is a cross-sectional view showing the harness member 1, including a central axis C of the harness member 1. Hereinafter, a direction in which the central axis C of the harness member 1 extends is referred to as an axial direction. In addition, a direction of a circumference about the central axis C of the harness member 1 is simply referred to as a circumferential direction.

As shown in FIGS. 1 and 2, the harness member 1 includes a sensor 2, a cable 3, a housing 4, a heat-shrink tubing 5, and a hot melt adhesive 6. The sensor 2 measures a physical quantity. An end portion of the cable 3 is electrically connected to the sensor 2. As shown in FIG. 3, a cylindrical insertion hole 400 through which the cable 3 is inserted is formed on the housing 4. As shown in FIGS. 1 and 2, the housing 4 collectively covers the sensor 2 and the end portion of the cable 3. Hereinafter, one side in the axial direction where the cable 3 extends to the outside from the insertion hole 400 (e.g., the right side in FIGS. 1 to 3) is referred to as a proximal end side, and the opposite side (e.g., the left side of FIGS. 1 to 3) is referred to as the distal end side. The heat-shrink tubing 5 collectively covers the housing 4 and a portion of the cable exposed from the insertion hole 400 on the proximal end side. The hot melt adhesive 6 is provided between the heat-shrink tubing 5 and the cable 3 and between the heat-shrink tubing 5 and the housing 4 and seals between the heat-shrink tubing 5 and the cable 3 and between the heat-shrink tubing 5 and the housing 4.

The sensor 2 includes a sensor main body 21 to measure a physical quantity such as magnetism, temperature, vibration, torque or rotational speed, and plural lead terminals 22 (two in the first embodiment) protruding from the sensor main body 21. The plural lead terminals 22 are electrically connected to the cable 3. Although the components connected to the cable 3 are the lead terminals 22 of the sensor 2 in the first embodiment, it is not limited thereto. The cable 3 can be connected to, e.g., a conductive pattern on a substrate or a terminal of a connector, etc.

The cable 3 has two covered electrical wires 31, and a cylindrical sheath 32 collectively covering the two covered electrical wires 31. The covered electrical wire 31 includes a center conductor 311 and an insulation coating 312 covering the center conductor 311. The sheath 32 is made of, e.g., an electrically insulating resin such as fluorine-based resin. In FIG. 3, etc., only the sheath 32 of the cable 3 is shown for the purpose of convenience. Alternatively, the cable 3 may be composed of, e.g., only a center conductor and an insulation covering thereof.

Figure 4:
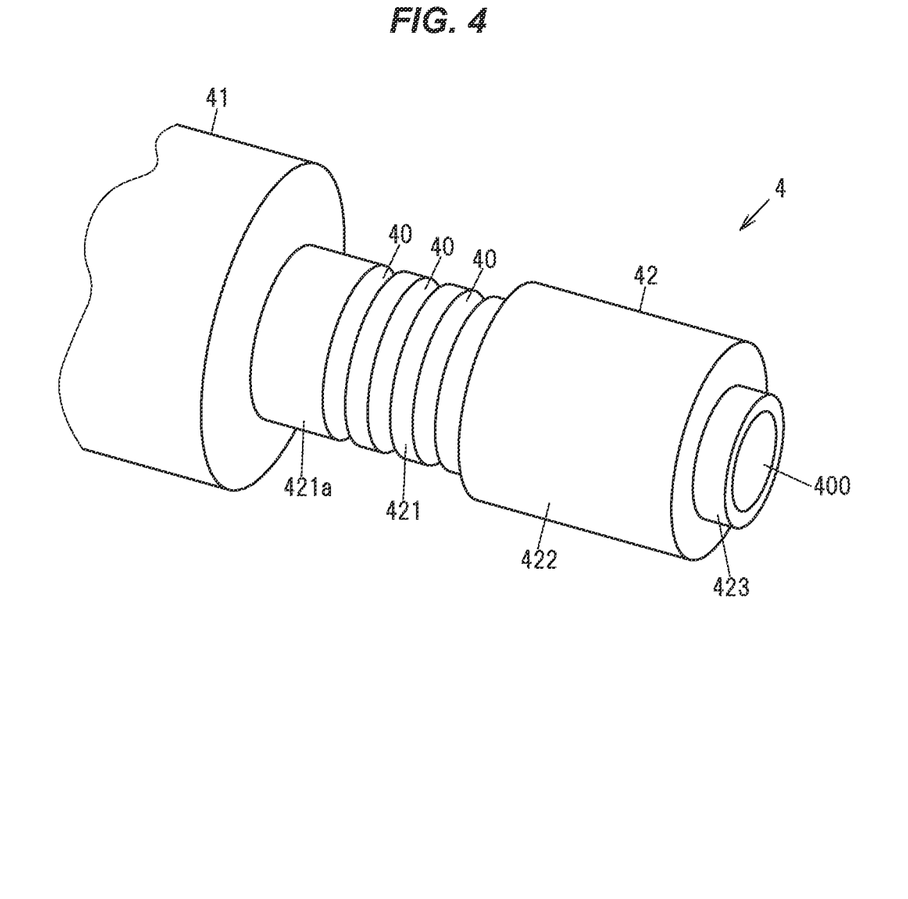
FIG. 4 is a perspective view showing a housing in the first embodiment which is shown alone with a portion omitted.

FIG. 4 is a perspective view showing the housing 4 alone with a portion omitted. As shown in FIGS. 1 to 4, the housing 4 has a shape which is long in the axial direction. The housing 4 is formed by injection molding using, e.g., a resin such as nylon or polybutylene terephthalate (PBT), etc. The insertion hole 400 of the housing 4 is formed slightly larger than an outer diameter of the cable 3, and the cable 3 is inserted through the insertion hole 400.

The housing 4 integrally includes a distal end (tip end)-side portion 41 inside which the sensor 2 is arranged, and a proximal end (base end)-side portion 42 around which the heat-shrink tubing 5 is arranged. In the first embodiment, the distal end-side portion 41 is configured such that the sensor 2 is arranged therein, as shown in FIGS. 1 and 2. However, when the cable 3 is not connected to the sensor 2 but is connected to a connector terminal, the distal end-side portion 41 may be formed as a connector to be fitted to another connector. As shown in FIGS. 3 and 4, the proximal end-side portion 42 includes a first portion 421, a second portion 422 and a third portion 423 sequentially from the distal end side.

The first portion 421 is formed in a substantially cylindrical shape. Recesses 40 are formed on the first portion 421 at three positions in the axial direction so as to be recessed from an outer circumferential surface 421a of the first portion 421 which is covered with the heat-shrink tubing 5. The three recesses 40 are formed at equal intervals in the axial direction. Each recess 40 is formed in a groove shape extending in a direction intersecting the axial direction. In particular, the recess 40 is formed in a substantially annular shape along the circumferential direction and around the entire circumference. As shown in FIG. 3, an inner surface of the recess 40 is a curved surface without unevenness due to bending. In particular, the inner surface of the recess 40 is formed so that its cross-sectional shape parallel to both a width direction of the recess 40 (i.e., the axial direction) and a depth direction of the recess 40 (i.e., a radial direction) is curved in an arc shape.

A maximum depth D of the recess 40 when viewing in cross section parallel to both the width direction and the depth direction of the recess 40 (e.g., a cross section shown in FIG. 3) can be set to, e.g., not less than ¼ of a thickness T of a portion of the first portion 421 adjacent to the recesses 40 (i.e., a portion at which the recesses 40 are not formed). By setting the maximum depth D of the recess 40 to not less than ¼ of the thickness of the portion of the first portion 421 adjacent to the recesses 40, the hot melt adhesive 6 in a molten state easily flows into the recesses 40 when the heat-shrink tubing 5 with the hot melt adhesive 6 is heated and shrunk, as will be described later. A portion of an inner circumferential surface 51 of the heat-shrink tubing 5 in the vicinity of the recesses 40 thereby comes into contact with the outer circumferential surface 421a of the first portion 421 directly or via the extremely thin hot melt adhesive 6. As a result, a frictional force between the inner circumferential surface 51 of the heat-shrink tubing 5 and the outer circumferential surface 421a of the first portion 421 is likely to increase when the heat-shrink tubing 5 is shrunk, and it is possible to prevent the heat-shrink tubing 5 and the housing 4 from being largely misaligned with each other in the axial direction when the heat-shrink tubing 5 is heated and shrunk.

Meanwhile, a maximum width W of the recess 40 when viewing in cross section parallel to both the width direction and the depth direction of the recess 40 can be set to not less than the maximum depth D of the recess 40. This makes it easy to prevent air from remaining in the recesses 40 when the molten hot melt adhesive 6 flows into the recesses 40, as will be described later. However, the dimension of the recess 40 is not limited thereto and, e.g., the width of the recess 40 may be less than the maximum depth of the recess 40. For example, the width of the recess 40 can be not less than 1 mm and not more than 5 mm, and the depth of the recess 40 can be not less than 1 mm and not more than 4 mm.

The second portion 422 protrudes outward relative to the first portion 421 and is formed in a substantially cylindrical shape. The third portion 423 has a smaller diameter than each of the first portion 421 and the second portion 422 and is formed in a substantially annular shape.

The heat-shrink tubing 5 is made of, e.g., a resin material such as polyolefin or polyvinyl chloride and is formed in a cylindrical shape. The heat-shrink tubing 5 is configured to shrink at least inward in the radial direction by heating to not less than a predetermined temperature (e.g., 150° C.). As shown in FIG. 3, the heat-shrink tubing 5 is provided so as to collectively cover the proximal end-side portion 42 of the housing 4 and an exposed portion of the cable 3 from the insertion hole 400 of the housing 4. A distal end position of the heat-shrink tubing 5 is located on the distal end side relative to the most distal end-side recess 40 among the three recesses 40. The heat-shrink tubing 5 entirely covers all the recesses 40. That is, the recesses 40 are not exposed from the heat-shrink tubing 5. In the first embodiment, the inner circumferential surface 51 of the heat-shrink tubing 5 is in contact with a portion of the outer circumferential surface 421a of the first portion 421 of the housing 4 adjacent to the recesses 40 (e.g., surface portions 421b between the adjacent recesses 40, etc.), directly or via the extremely thin hot melt adhesive 6 (e.g., with a thickness of not less than 0.01 mm and not more than 0.1 mm).

The hot melt adhesive 6 is interposed between the heat-shrink tubing 5 and the housing 4. The hot melt adhesive 6 is an adhesive melting at a temperature of not less than a predetermined temperature (e.g., 125° C.-135° C., etc.) and curing again by temperature drop to not more than the predetermined temperature, and is formed of, e.g., a thermoplastic such as ethylene vinyl acetate (EVA). In the first embodiment, a melting point of the hot melt adhesive 6 is lower than a temperature at which the heat-shrink tubing 5 starts to shrink. The hot melt adhesive 6 is adhesive to all of the housing 4, the sheath 32 and the heat-shrink tubing 5. The hot melt adhesive 6 serves to seal between the heat-shrink tubing 5 and the housing 4 and between the heat-shrink tubing 5 and the cable 3 and prevent foreign matter such as water from passing therebetween.

Figure 5:
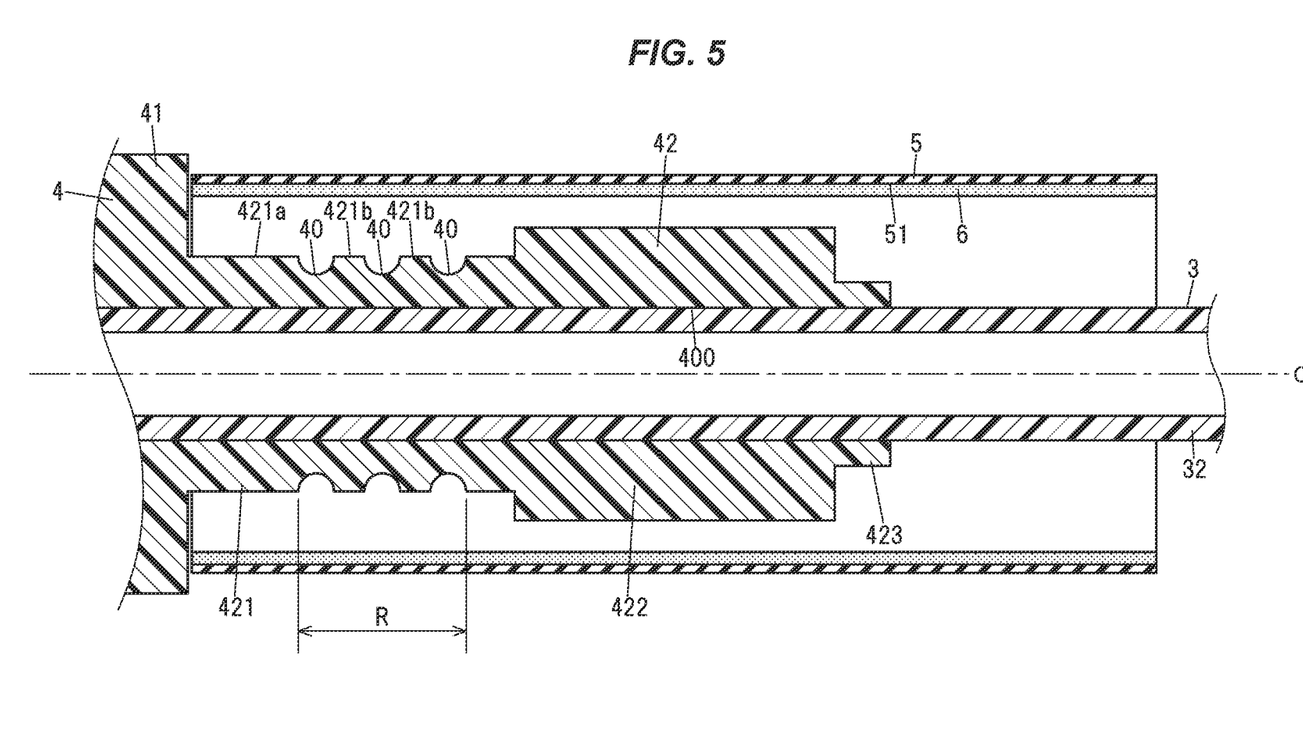
FIG. 5 is a cross-sectional view showing a state before a heat-shrink tubing with a hot melt adhesive is attached to the housing and a cable in the first embodiment.

FIG. 5 is a cross-sectional view showing a state before the heat-shrink tubing 5 with the hot melt adhesive 6 is attached to the housing 4 and the cable 3. As shown in FIG. 5, the hot melt adhesive 6 is arranged on the entire inner circumferential surface 51 of the heat-shrink tubing 5 at least in the state before the heat-shrink tubing 5 shrinks. Then, in the state in which the heat-shrink tubing 5 has shrunk, due to shrinkage of the heat-shrink tubing 5, the hut melt adhesive 6 is in contact with the heat-shrink tubing 5 and also with both the housing 4 and the cable 3 and is also partially pushed out of the heat-shrink tubing 5 on both sides in the axial direction, as shown in FIG. 3. In addition, in the state in which the heat-shrink tubing 5 has shrunk, the hot melt adhesive 6 is not located between the inner circumferential surface 51 of the heat-shrink tubing 5 and a portion of the outer circumferential surface 421a of the first portion 421 of the housing 4 adjacent to the recesses 40, or is present in an extremely thin state. Then, a portion of the hot melt adhesive 6 fills all the recesses 40. That is, a portion of the hot melt adhesive 6 melted between the outer circumferential surface 421a of the first portion 421 and the inner circumferential surface 51 of the heat-shrink tubing 5 flows into the recesses 40.

Next, a method for adhering the heat-shrink tubing 5 and the hot melt adhesive 6 to the outer circumference of the proximal end-side portion 42 of the housing 4 will be described.

Firstly, the heat-shrink tubing 5 having the hot melt adhesive 6 on the entire inner circumferential surface 51 is prepared. The heat-shrink tubing 5 with the hot melt adhesive 6 prepared here is formed such that an inner diameter of the hot melt adhesive 6 is larger than the proximal end-side portion 42 of the housing 4.

Then, the housing 4 and the cable 3 are inserted into the heat-shrink tubing 5 with the hot melt adhesive 6, and the distal end position of the heat-shrink tubing 5 with the hot melt adhesive 6 is aligned with a position close to the proximal end of the distal end-side portion 41 of the housing 4. The state at this time is the state shown in FIG. 5.

From the state shown in FIG. 5, the heat-shrink tubing 5 with the hot melt adhesive 6 is heated using a heating device (not shown), etc., up to a temperature which is not less than the melting point of the hot melt adhesive 6 and at which the heat-shrink tubing 5 shrinks. By heating, the hot melt adhesive 6 is melted and the heat-shrink tubing 5 shrinks in the radial direction, and the heat-shrink tubing 5 with the hot melt adhesive 6 thereby adheres the outer circumference of the proximal end-side portion 42 of the housing 4. At this time, a portion of the molten hot melt adhesive 6 flows into the recesses 40 and the inner circumferential surface 51 of the heat-shrink tubing 5 comes into contact with a portion of the outer circumferential surface 421a of the first portion 421 of the housing 4 adjacent to the recesses 40 directly or via the extremely thin hot melt adhesive 6, as shown in FIG. 3. As a result, a frictional force is obtained between the heat-shrink tubing 5 and the housing 4, and shrinkage of a distal end-side portion of the heat-shrink tubing 5 toward the proximal end side in the axial direction at the time of shrinking of the heat-shrink tubing 5 is suppressed.

Here, a region of all the recesses 40 in the axial direction from one end to the other end in the axial direction is defined as a recess formation region R, as shown in FIG. 5. In addition, a total volume of all the recesses 40 is defined as a volume V1, and a volume obtained by multiplying a cross-sectional area of the hot melt adhesive 6 orthogonal to the axial direction before heat shrinkage by a length of the recess formation region R is defined as a volume V2. At this time, a ratio V1/V2 of the volume V1 to the volume V2 is preferably not less than 0.8 and not more than 1.2. By setting the ratio V1/V2 to not less than 0.8, it is possible to sufficiently put the hot melt adhesive 6 in the recesses 40 to the extent that the inner circumferential surface 51 of the heat-shrink tubing 5 after shrinkage can be directly in contact with the outer circumferential surface 421a of the first portion 421 or can be in contact with the outer circumferential surface 421a of the first portion 421 via the extremely thin hot melt adhesive 6. By setting the ratio V1/V2 to not more than 1.2, it is possible to prevent, e.g., the hot melt adhesive 6 from not spreading in the entire recesses 40 and air from remaining in the recesses 40.

(Functions and Effects of the First Embodiment)

In the first embodiment, the recesses 40 are formed on the housing 4 so as to be recessed from the outer circumferential surface 421a of the first portion 421, and at least a portion of the hot melt adhesive 6 melted between the outer circumferential surface 421a of the first portion 421 and the inner circumferential surface 51 of the heat-shrink tubing 5 flows into the recesses 40. A portion of the inner circumferential surface 51 of the heat-shrink tubing 5 around the recesses 40 thus comes into contact with the outer circumferential surface 421a of the first portion 421 directly or via the extremely thin hot melt adhesive 6. Therefore, when the heat-shrink tubing 5 arranged around the housing 4 is heated and shrunk, a frictional three is obtained between the heat-shrink tubing 5 and the housing 4 and it is possible to prevent the heat-shrink tubing 5 from being largely displaced toward the proximal end side in the axial direction with respect to a desired position.

Figure 6:
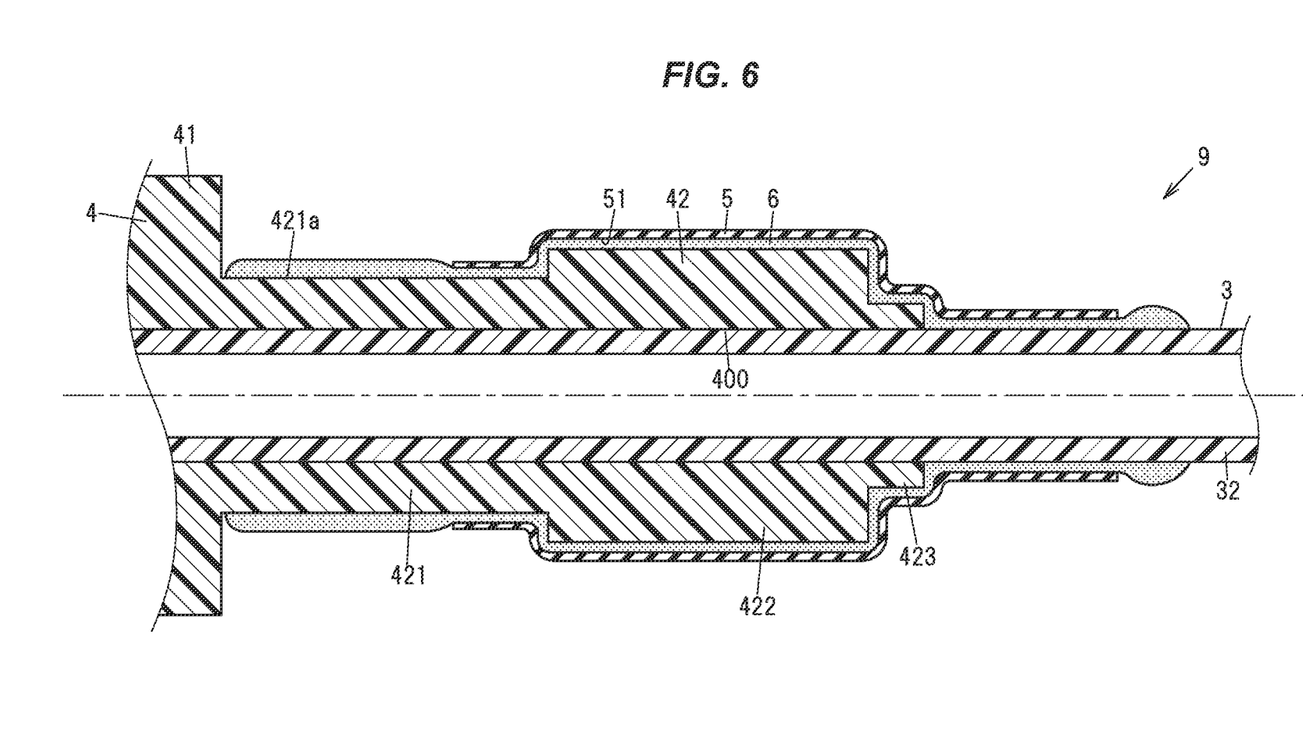
FIG. 6 is a cross-sectional view showing the harness member in Comparative Example, including the central axis of the harness member.

Now, a comparative embodiment shown in FIG. 6 is examined. The comparative embodiment is a harness member 9 which has the same basic structure as the first embodiment, but recesses (the reference numeral 40 in FIG. 5) entirely covered with the heat-shrink tubing 5 are not formed on the outer circumferential surface 421a of the first portion 421. Since an escape route for the molten hot melt adhesive 6 during shrinking of the heat-shrink tubing 5, such as the recesses 40 in the first embodiment, does not exist in the comparative embodiment, the molten hot melt adhesive 6 with a certain thickness is interposed between the entire heat-shrink tubing 5 and the housing 4. Therefore, when the heat-shrink tubing 5 shrinks in the radial direction, the molten hot melt adhesive 6 acts like a lubricant and the heat-shrink tubing 5 is largely displaced toward the proximal end side in the axial direction by a radial stress which is generated in the hot melt adhesive 6 as the heat-shrink tubing 5 shrinks.

On the other hand, in the first embodiment, since at least a portion of the hot melt adhesive 6 melted between the outer circumferential surface 421a of the first portion 421 and the inner circumferential surface 51 of the heat-shrink tubing 5 flows into the recesses 40 as described above, it is possible to prevent a large change in the distal end position of the heat-shrink tubing 5 before and after heat shrinkage. It has been confirmed that a ratio of a length of axial movement of the distal end position of the heat-shrink tubing 5 before and after the shrinkage of the heat-shrink tubing 5 in the first embodiment to a length of axial movement of the distal end position of the heat-shrink tubing 5 before and after the shrinkage of the heat-shrink tubing 5 in the comparative embodiment is not more than 0.5.

In addition, the heat-shrink tubing 5 entirely covers the recesses 40. Therefore, when heating and shrinking the heat-shrink tubing 5 which is arranged around the housing 4, the molten hot melt adhesive 6 between the heat-shrink tubing 5 and the housing 4 easily enters the recesses 40. As a result, it is easy to realize a configuration in which a portion of the inner circumferential surface 51 of the heat-shrink tubing 5 around the recesses 40 comes into contact with the outer circumferential surface 421a of the first portion 421 directly or via the extremely thin hot melt adhesive 6.

In addition, the inner surface of the recess 40 is a curved surface without unevenness due to bending. Therefore, the molten hot melt adhesive 6 easily spreads in the entire recesses 40 and it is possible to prevent air from remaining in the recesses 40. That is, the configuration of the recess 40 in the first embodiment allows the hot melt adhesive 6 to easily spread in the entire recesses 40 and it is thus easier to obtain a frictional force between the heat-shrink tubing 5 and the housing 4 during shrinking of the heat-shrink tubing 5. As a result, an amount of axial displacement of the distal end position of the heat-shrink tubing 5 before and after the shrinkage of the heat-shrink tubing 5 can be reduced.

In addition, the recess 40 is formed in a groove shape extending in a direction intersecting the axial direction. Therefore, the recess 40 can be formed in a wide range in the circumferential direction, and the frictional force between the heat-shrink tubing 5 and the housing 4 during shrinking of the heat-shrink tubing 5 is easily obtained in a wide range in the circumferential direction. Particularly in the first embodiment, the recesses 40 are formed along the circumferential direction and around the entire outer circumferential surface 421a of the first portion 421. Therefore, the frictional force between the heat-shrink tubing 5 and the housing 4 during shrinking of the heat-shrink tubing 5 can be obtained around the entire circumference, and the amount of axial displacement of the distal end position of the heat-shrink tubing 5 before and after the shrinkage of the heat-shrink tubing 5 can be further reduced.

In addition, the recesses 40 are formed at plural positions in the axial direction. Therefore, when the heat-shrink tubing 5 shrinks, the frictional force between the heat-shrink tubing 5 and the housing 4 can be obtained at plural positions in the axial direction, and the amount of axial displacement of the distal end position of the heat-shrink tubing 5 before and after the shrinkage of the heat-shrink tubing 5 can be further reduced.

In addition, the housing 4 includes the first portion 421 having the recesses 40 and the second portion 422 which is formed on the proximal end side of the first portion 421 and protrudes outward relative to the first portion 421. Therefore, when the heat-shrink tubing 5 shrinks, the frictional force is obtained between the heat-shrink tubing 5 and the portion of the outer circumferential surface 421a of the first portion 421 around the recesses 40 as described above, and the frictional force is also obtained between the heat-shrink tubing 5 and the second portion 422. That is, the heat-shrink tubing 5 is caught at the second portion 422, and the amount of axial displacement of the distal end position of the heat-shrink tubing 5 before and after the shrinkage of the heat-shrink tubing 5 can be further reduced.

As described above, in the first embodiment, it is possible to provide a harness member in which an amount of axial displacement of the heat-shrink tubing before and after shrinkage can be reduced.

Second Embodiment

Figure 7:
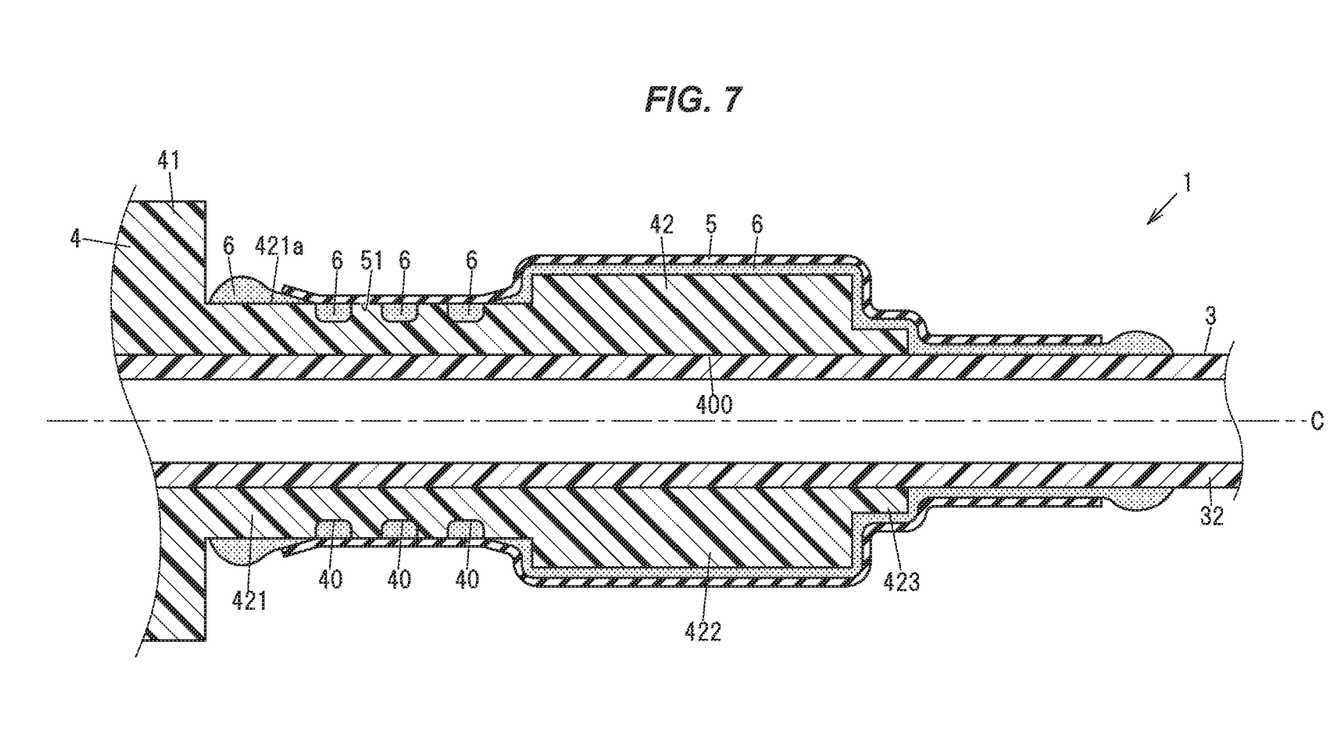
FIG. 7 is a cross-sectional view showing the harness member in the second embodiment, including the central axis of the harness member.

FIG. 7 is a cross-sectional view showing the harness member 1 in the second embodiment, including the central axis C of the harness member 1. In the second embodiment, the shape of the recess 40 is modified from that in the first embodiment. The inner surface of the recess 40 is formed as a curved surface also in the second embodiment. The inner surface of the recess 40 in the second embodiment is formed such that its cross-sectional shape parallel to both the width direction of the recess 40 the axial direction) and the depth direction of the recess 40 (i.e., the radial direction) is a U-shape with rounded corners.

The other configuration in the second embodiment is the same as that in the first embodiment.

Of the reference numerals used in the second embodiment onward, the same reference numerals as those used in the already described embodiment/embodiments represent the same constituent elements, etc., as those in the already described embodiment/embodiments unless otherwise specified.

(Functions and Effects of the Second Embodiment)

The second embodiment also exerts the same functions and effects as those in the first embodiment.

Third Embodiment

Figure 8:
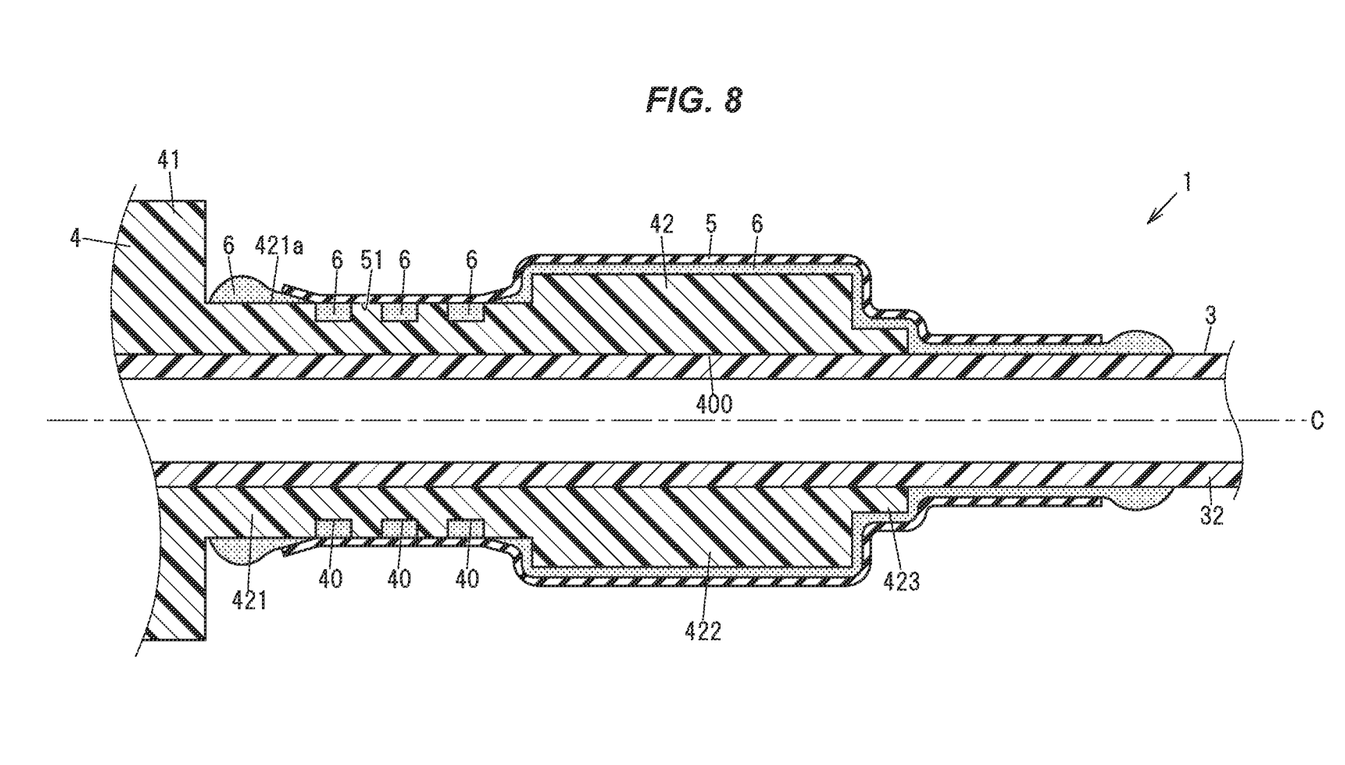
FIG. 8 is a cross-sectional view showing the harness member in the third embodiment, including the central axis of the harness member.

FIG. 8 is a cross-sectional view showing the harness member 1 in the third embodiment, including the central axis C of the harness member 1. In the third embodiment, the shape of the recess 40 is modified from that in the first embodiment. The shape of the recess 40 is a rectangle when the harness member 1 is viewed in cross section parallel to both the width direction of the recess 40 (i.e., the axial direction) and the depth direction of the recess 40 (i.e., the radial direction). Of the inner surfaces of the recess 40, a pair of side surfaces facing in the axial direction are formed as flat surfaces orthogonal to the axial direction.

The other configuration in the third embodiment is the same as that in the first embodiment.

(Functions and Effects of the Third Embodiment)

The shape of the recess 40 is a rectangle when viewed in cross section parallel to both the width direction and the depth direction of the recess 40. Accordingly, of the inner surfaces of the recess 40, the pair of side surfaces facing in the axial direction are formed as flat surfaces orthogonal to the axial direction. Therefore, when the heat-shrink tubing 5 shrinks, the heat-shrink tubing 5 is likely to be caught near open ends of the recesses 40, allowing an amount of axial displacement of the distal end position of the heat-shrink tubing 5 to be reduced.

In addition, the third embodiment also exerts the same functions and effects as those in the first embodiment.

Fourth Embodiment

Figure 9:
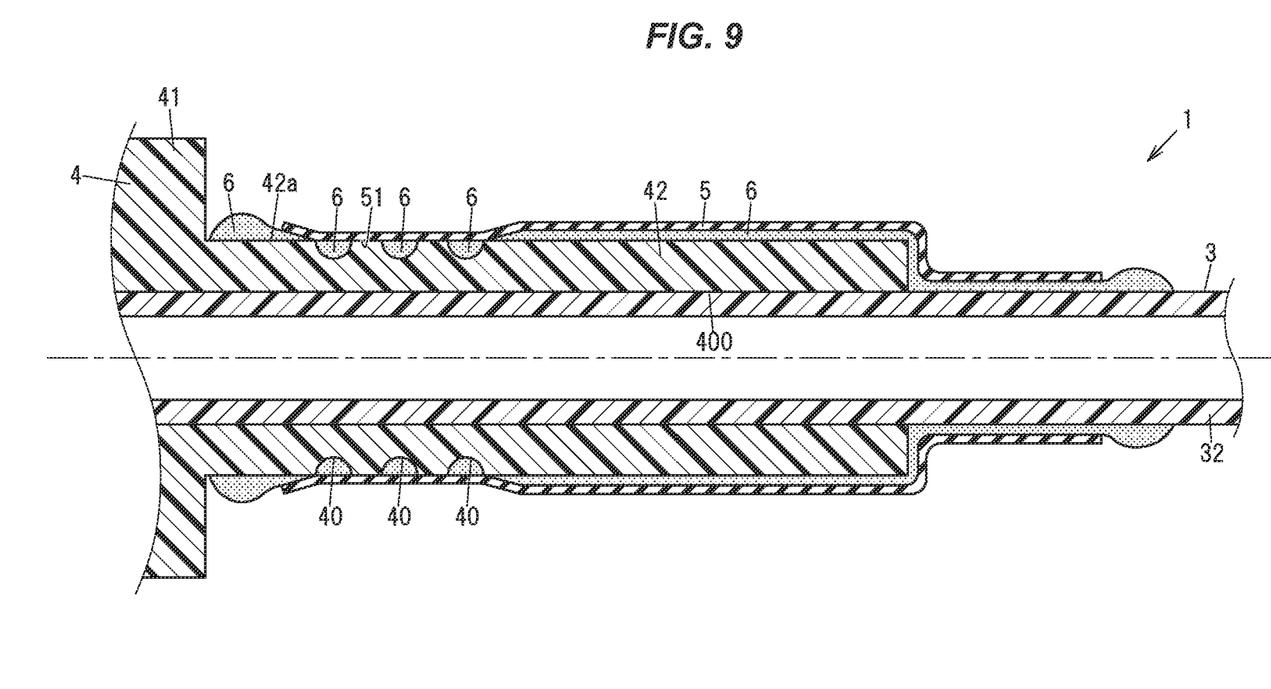
FIG. 9 is a cross-sectional view showing the harness member in the fourth embodiment, including the central axis of the harness member.

FIG. 9 is a cross-sectional view showing the harness member 1 in the fourth embodiment, including the central axis C of the harness member 1. In the fourth embodiment, the shape of the proximal end-side portion 42 of the housing 4 is modified from that in the first embodiment. That is, in the fourth embodiment, the proximal end-side portion 42 of the housing 4 has a constant outer diameter, except a portion on which the recesses 40 are formed. The recesses 40 are formed so as to be recessed from an outer circumferential surface 42a of the proximal end-side portion 42 which is covered with the heat-shrink tubing 5.

The other configuration is the same as that in the first embodiment.

(Functions and Effects of the Fourth Embodiment)

In the fourth embodiment, it is easy to reduce the size of the proximal end-side portion 42 of the housing 4.

In addition, the fourth embodiment also exerts the same functions and effects as those in the first embodiment.

Fifth Embodiment

Figure 10:
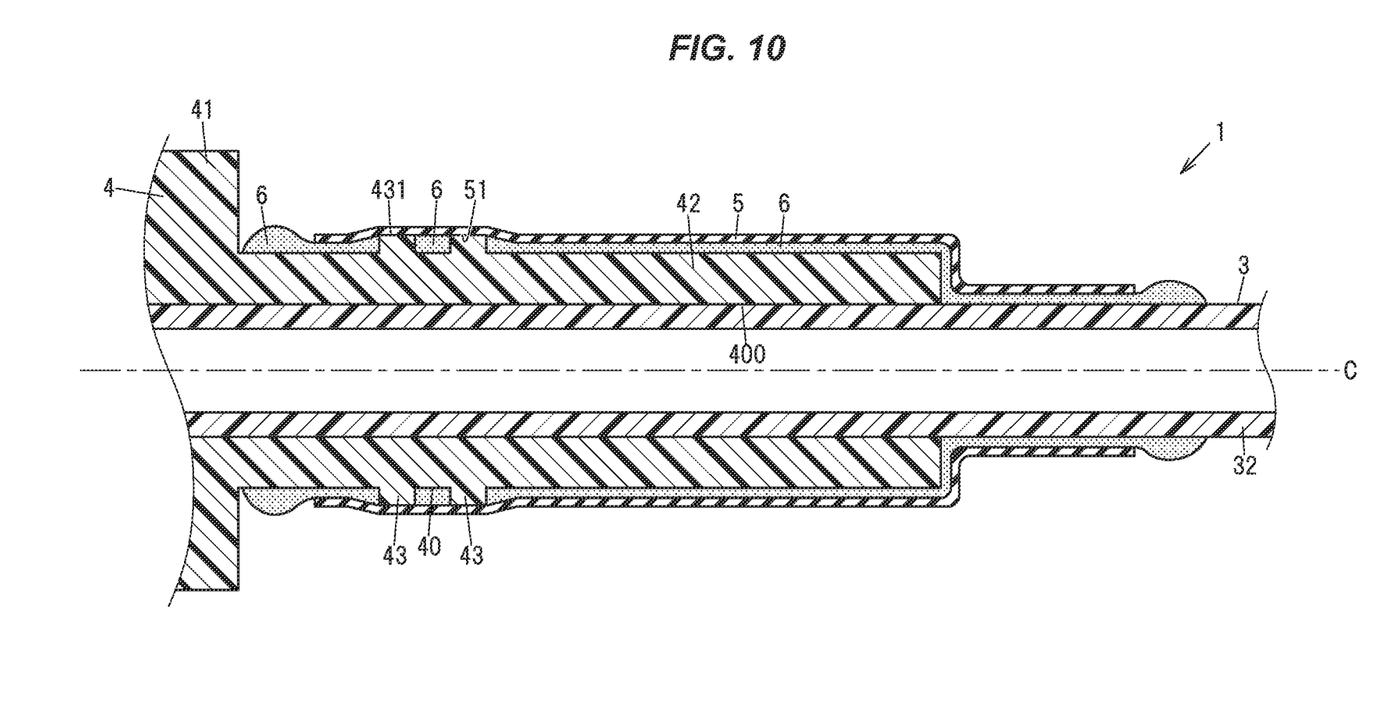
FIG. 10 is a cross-sectional view showing the harness member in the fifth embodiment, including the central axis of the harness member.

FIG. 10 is a cross-sectional view showing the harness member 1 in the fifth embodiment, including the central axis C of the harness member 1. In the fifth embodiment, the proximal end-side portion 42 of the housing 4 is modified from that in the first embodiment. In the fifth embodiment, the proximal end-side portion 42 of the housing 4 is formed in a cylindrical shape with a constant outer diameter substantially entirely in the axial direction. In addition, raised portions 43 protruding outward are formed on the proximal end-side portion 42 at two positions in the axial direction. The two raised portions 43 are each formed in an annular shape extending around the entire circumference and are arranged at a distance from each other. Then, the recess 40 is formed between the two raised portions 43. Also in the fifth embodiment, the heat-shrink tubing 5 is arranged so as to entirely cover the recess 40 (i.e., so as to stretch over the two raised portions 43), and a portion of the hot melt adhesive 6 is arranged in the recess 40. Then, the heat-shrink tubing 5 comes into contact with outer circumferential surfaces 431 of the raised portions 43 directly or via the extremely thin hot melt adhesive 6. That is, in the fifth embodiment, the recess 40 is formed so as to be recessed from the outer circumferential surfaces 431 of the raised portions 43.

The other configuration is the same as that in the first embodiment.

(Functions and Effects of the Fifth Embodiment)

The fifth embodiment also exerts the same functions and effects as those in the first embodiment.

(Summary of the Embodiments)

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] A harness member (1), comprising: a cable (3); a housing (4) with an insertion hole (400) through which the cable (3) is inserted; a heat-shrink tubing (5) covering the housing (4) and the cable (3) exposed on one side from the insertion hole (400); and a hot melt adhesive (6) to seal between the heat-shrink tubing (5) and the cable (3) and between the heat-shrink tubing (5) and the housing (4), wherein a recess (40) is formed on the housing (4) so as to be recessed from an outer circumferential surface (42a, 421a, 431) covered with the heat-shrink tubing (5), and wherein at least a portion of the hot melt adhesive (6) melted between the outer circumferential surface (42a, 421a, 431) of the housing (4) and an inner circumferential surface (51) of the heat-shrink tubing (5) has flowed into the recess.

[2] The harness member (1) described in [1], wherein the heat-shrink tubing (5) entirely covers the recess (5).

[3] The harness member (1) described in [1] or [2], wherein an inner surface of the recess (40) comprises a curved surface.

[4] The harness member (1) described in [1] or [2], wherein a shape of the recess (40) is a rectangle when viewed in cross section parallel to both a width direction and a depth direction of the recess (40).

[5] The harness member (1) described in any one of [1] to [4], wherein the recess (40) is formed in a groove shape extending in a direction intersecting an axial direction.

[6] The harness member (1) described in [5], wherein the recess (40) is formed along a circumferential direction and around the outer circumferential surface (42a, 421a, 431) of the housing (4) entirely.

[7] The harness member (1) described in [6], wherein the recesses (40) are formed at a plurality of positions in the axial direction.

Although the embodiments of the invention have been described, the invention according to claims is not to be limited to the embodiments described above. Further, please note that not all combinations of the features described in the embodiments are necessary to solve the problem of the invention. In addition, the invention can be appropriately modified and implemented without departing from the gist thereof.

For example, although the examples in which the recess/recesses is/are formed around the entire circumstance have been described in the embodiments, the recesses 40 may be formed, e.g., intermittently in the circumferential direction. In this case, plural recesses may be formed at plural positions in the axial direction in a staggered manner (e.g., in a grid pattern) so that the recesses exist on the entire circumference when viewed in the axial direction.

In addition, the recess may be formed as, e.g., a spiral groove about the central axis of the harness member, or may be formed in a groove shape extending in the axial direction. In addition, the recess can have a shape other than the groove shape, such as, e.g., a hemispherical shape or a polyhedral shape.

The invention claimed is:

1. A harness member, comprising:
   a cable;
   a housing with an insertion hole through which the cable is inserted;
   a heat-shrink tubing covering the housing and the cable exposed on one side from the insertion hole; and
   a hot melt adhesive to seal between the heat-shrink tubing and the cable and between the heat-shrink tubing and the housing,
   wherein a recess is formed in a substantially annular shape along a circumferential direction on the housing so as to be recessed from an outer circumferential surface of the housing covered with the heat-shrink tubing, and
   wherein at least a portion of the hot melt adhesive melted between the outer circumferential surface of the housing and an inner circumferential surface of the heat-shrink tubing has flowed into the recess, wherein the heat-shrunk tubing entirely covers all the recess along an axial direction of the cable, wherein the housing integrally includes a distal end-side portion inside which a sensor is arranged, and a proximal end-side portion around which the heat-shrink tubing is arranged, wherein the proximal end-side portion includes a first portion, and a second portion protruding outward relative to the first portion, wherein the distal end-side portion protrudes outward relative to the first portion, and wherein the recess is formed at the first portion and a width of the recess is smaller than a distance between the distal end-side portion and the second portion along the axial direction of the cable.

2. The harness member according to claim 1, wherein the heat-shrink tubing entirely covers the recess.

3. The harness member according to claim 1, wherein an inner surface of the recess comprises a curved surface.

4. The harness member according to claim 1, wherein a shape of the recess is a rectangle when viewed in cross section parallel to both a width direction and a depth direction of the recess.

5. The harness member according to claim 1, wherein the recess is formed in a groove shape extending in a direction intersecting the axial direction of the cable.

6. The harness member according to claim 5, wherein the recess is formed along a circumferential direction and around the outer circumferential surface of the housing entirely.

7. The harness member according to claim 6, wherein a plurality of recesses are formed along a circumferential direction and entirely around the outer circumferential surface of the housing at a plurality of positions in the axial direction.

* * * * *